(12) United States Patent
Makwinski et al.

(10) Patent No.: US 7,193,159 B2
(45) Date of Patent: Mar. 20, 2007

(54) DIVIDED RACEWAY WITH DOWNWARDLY FACING OUTLET DEVICES

(75) Inventors: Mark Makwinski, Cromwell, CT (US); Richard R. Picard, West Hartford, CT (US); Shawn Stempinski, Wethersfield, CT (US); Jeffery Hemingway, Burlington, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 11/322,707

(22) Filed: Dec. 30, 2005

(65) Prior Publication Data

US 2006/0175086 A1    Aug. 10, 2006

Related U.S. Application Data

(63) Continuation-in-part of application No. 11/035,477, filed on Jan. 13, 2005.

(51) Int. Cl.
*H02B 1/40*    (2006.01)

(52) U.S. Cl. ................ 174/480; 174/481; 174/68.1; 174/68.3; 52/220.1; 52/220.7

(58) Field of Classification Search ................ 174/480, 174/481, 60, 67, 68.1, 68.3, 95, 97, 99 R, 174/98, 135, 72 R; 220/3.2, 3.8, 3.5; 385/134, 385/135; 439/207, 209, 210, 211, 212, 213; 52/220.1, 220.3, 220.7, 220.8, 249

See application file for complete search history.

(56) References Cited

U.S. PATENT DOCUMENTS

| | | | | |
|---|---|---|---|---|
| 594,998 | A * | 12/1897 | Lyle | ........................ 52/220.3 |
| 6,180,878 | B1 * | 1/2001 | Gretz | ........................ 174/48 |
| 6,259,020 | B1 * | 7/2001 | Ashline et al. | ............... 174/48 |
| 6,284,975 | B1 * | 9/2001 | McCord et al. | ........... 174/71 R |
| 6,323,421 | B1 * | 11/2001 | Pawson et al. | ............... 174/48 |
| 6,342,675 | B1 * | 1/2002 | DeBartolo et al. | ............ 174/50 |
| 6,362,420 | B1 |  3/2002 | Bacouelle et al. | ............ 174/48 |
| 6,384,336 | B1 * | 5/2002 | VanderVelde et al. | ........ 174/95 |
| D484,469 | S | 12/2003 | Thibault | ..................... D13/184 |
| 6,664,467 | B1 * | 12/2003 | de la Borbolla | .............. 174/48 |

(Continued)

FOREIGN PATENT DOCUMENTS

JP        2005229775        8/2005

*Primary Examiner*—Angel R. Estrada
(74) *Attorney, Agent, or Firm*—McCormick, Paulding & Huber LLP

(57) ABSTRACT

A raceway base has a T-shaped configuration that mounts to a flat surface so that the stem of the T defines a divider wall for isolating adjacent wire-ways with low voltage data/com cabling and high voltage power cabling. L-shaped raceway covers are separately secured to the raceway base, and allow for outlet devices to be mounted in one of these raceways in a gap between spaced L-shaped raceway covers. A U-shaped device bracket is adapted to be snapped in place one of these wire-ways, and a housing or shroud cooperates with the device bracket to define a pathway for cables crossing through openings in the dividing wall of the base, for connection to outlet devices oriented perpendicular to the flat surface. This geometry provides a generous radius of curvature for data/communication cabling carried in one wire-way, and connected to downwardly facing outlet jacks in the lower wall of the other L-shaped raceway cover.

21 Claims, 7 Drawing Sheets

U.S. PATENT DOCUMENTS

D486,130 S     2/2004  Thibault ................... D13/184
6,756,544 B2 * 6/2004  Handler ................... 174/68.1
6,936,766 B1 * 8/2005  Galasso ...................... 174/48

* cited by examiner

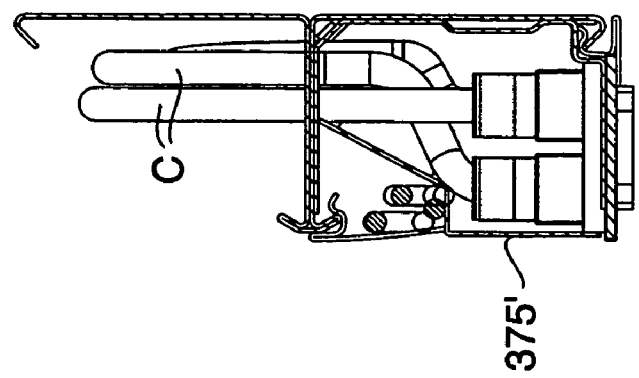
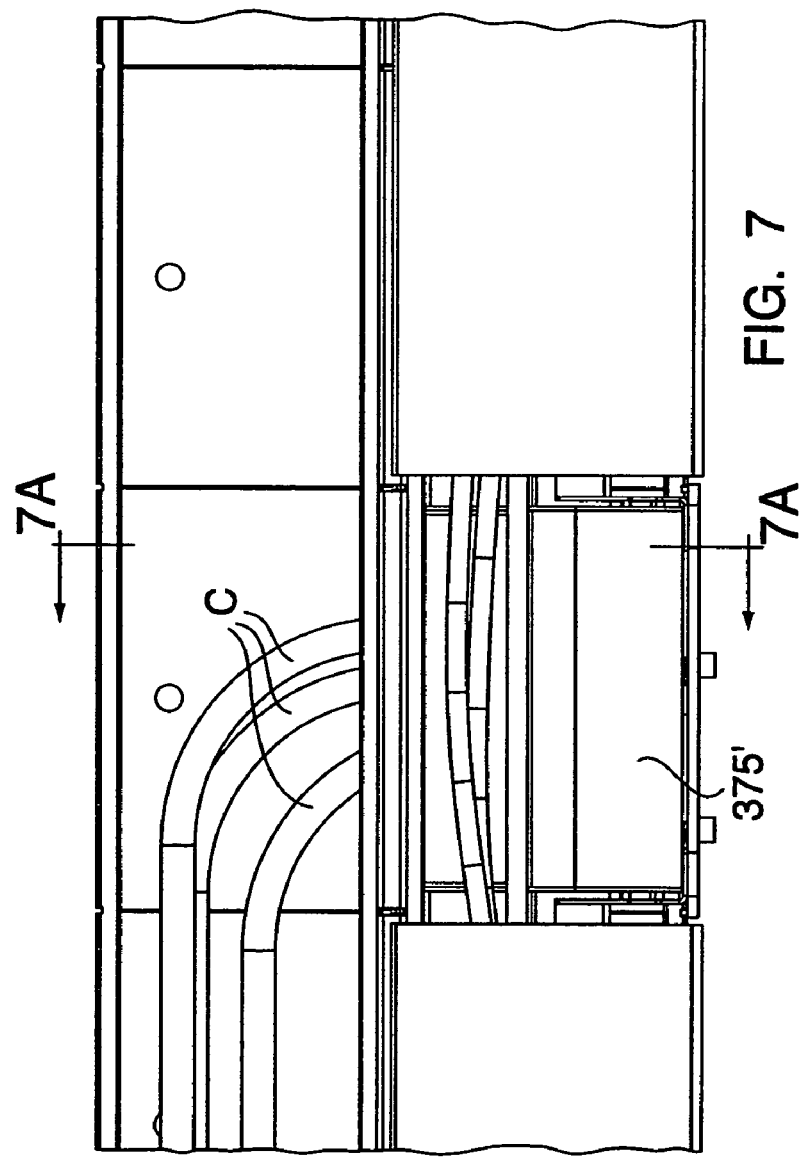
FIG. 7A
FIG. 7

DIVIDED RACEWAY WITH DOWNWARDLY FACING OUTLET DEVICES

CROSS-REFERENCE TO RELATED APPLICATION

This application claims priority to a co-pending application entitled MODULAR RACEWAY WITH BASE AND INTEGRAL DIVIDER, Ser. No. 11/035,477, filed Jan. 13, 2005. That co-pending application is incorporated by reference herein, and the present application comprises a continuation-in-part, with the claims of this application directed principally to the downwardly facing receptacle feature disclosed in the prior application, but more particularly disclosed and claimed herein.

SUMMARY OF APPLICATION SER. NO. 11/035,477, FILED Jan. 13, 2005

The relevant features of our co-pending application can be summarized as follows. A T-shaped raceway base of elongated configuration has uniformly spaced knock out openings provided between lines of weakening as shown in FIG. 16A of that co-pending application. Upper and lower raceway covers are provided for upper and lower wire-ways defined in part by the elongated T-shaped base and in part by the covers which are preferably L-shaped in cross section. Marginal edge portions of the elongated cover components of the raceway mate with a forward or leading edge of an integrally forming divider defined in the T-shaped base. Upper and lower marginal edges of the base mate with upper and lower marginal edges of the upper and lower cover components respectively. Thus, the base and the cover components define separated wire-ways having a divider wall therebetween.

Still with reference to the co-pending application, unique individual device brackets are designed for use with the U-shaped covers. Each device bracket has a generally U-shaped frame with flanges that are adapted to be received by projecting lips on the forward or leading edge of the divider wall. Each individual device bracket further includes a socket in the other leg of the U-shaped device bracket. This other leg is adapted to mate with the leading edge, or stem of the T-shaped raceway base. The other devices can then be provided in either the upper or lower wire-way, but need not be provided one above another. Thus, the outlet devices may comprise power outlets or data/communication outlets, and can be provided in any of the surfaces of the upper and lower L-shaped raceway cover components. When provided in a downwardly facing surface of the lower L-shaped raceway cover these devices are hidden, providing a protected location for the user's power cords and/or data cables which will ultimately be connected to these outlet devices. Moreover, the unique base and cover configuration allows for placement of outlet devices in either the upper or lower L-shaped raceway cover. Such placement flexibility offers advantages in raceway installations that are to be made behind a workstation or desk.

SUMMARY OF THE INVENTION

The present invention relates to a raceway system that includes an elongated raceway base, elongated raceway covers on said base and defining upper and lower wire-ways. An elongated dividing wall separates these upper and lower wire-ways so that relatively low voltage or data/communication cables can be accommodated in one of these wire-ways while nevertheless being electrically isolated from high voltage or power cables in the other of said wire-ways. The elongated divider wall includes spaced knockout openings, and these knockout openings are preferably provided between lines of weakening as described in our co-pending application and referred to briefly heretofor. The spaced knockout openings are designed to allow for cables in the upper raceway, for example, to cross over and to be accommodated by an outlet device provided in the adjacent or lower wire-way. A device bracket is adapted to be mounted in the lower wire-way in accordance with the invention so as to support such an outlet device in a downwardly facing relationship to the lower wire-way. The device brackets mates with an enclosure which is also provided inside the lower wire-way. The enclosure not only isolates the downwardly facing outlet device from cables running along the lower wire-way, but the enclosure also cooperates with the device bracket and with the base to define an enclosed isolated pathway for accommodating cables running from the upper wire-way across the divider wall and through the knockout opening for convenient connection to outlet devices facing downwardly in the lower wire-way. This result is achieved with minimal reduction in the lower section for the lower wire-way, allowing the cables to run past this enclosure without requiring any rerouting of cables in the lower wire-way.

BRIEF DESCRIPTION OF THE DRAWINGS

FIG. 1 corresponds to FIG. 16 A of our co-pending application.

FIG. 7 is a front elevation, and illustrates the device bracket FIG. 6 assembled with the outlet devices of FIG. 6, together with an enclosure or shroud secured to the device bracket.

FIG. 7A–A is a sectional view taken on the line A–A of FIG. 7.

FIG. 8 is showing a perspective view of the assembly of FIG. 7 and 7A–A with both the upper and lower cover component in place on the T-shaped raceway, and with the enclosure shroud of FIGS. 7 and 7A–A.

FIG. 9 illustrates the assembly of FIG. 8 with a device bracket cover overlapping the spaced end portions of the lower raceway cover components, and mated with the T-shaped divider wall as described in our prior co-pending application.

DETAILED DESCRIPTION OF FIGURES 1–3 INCLUSIVELY

Turning now to the drawings in greater detail, and referring specifically to the drawings from our prior co-pending application incorporated by reference herein, FIG. 1 reflects the disclosure in that earlier case as described with reference to FIG. 16A in that co-pending application.

Figure 1:
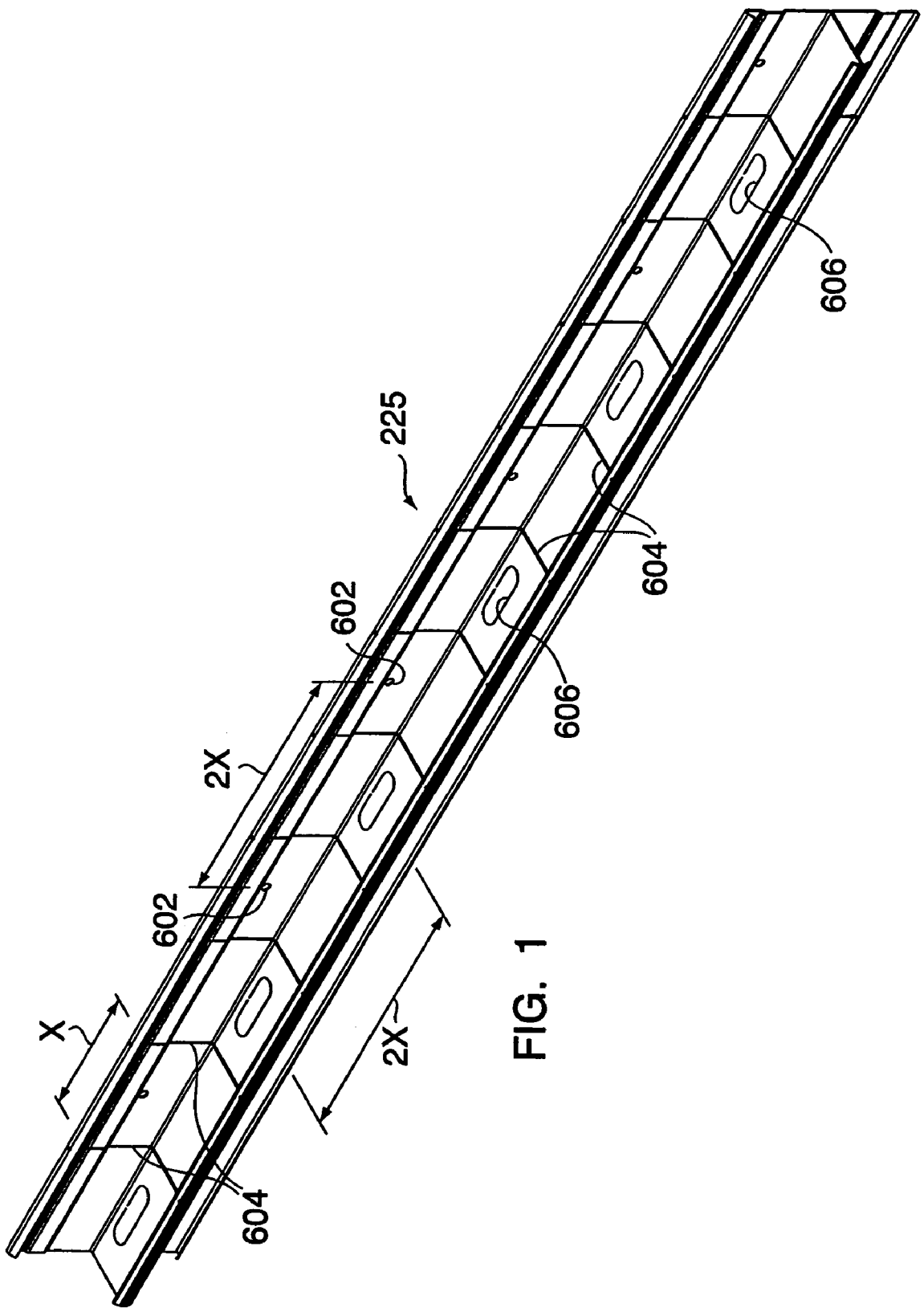
FIG. 1 is a top quartering perspective view illustrating a segment of the elongated T-shaped raceway base as it would appear ready for attachment to a wall structure. Wire management clips (not shown) are used to confine the cables running in the upper and lower wire-ways, located above and below respectively, the divider wall defined by the T-shaped raceway base.

More particularly, FIG. 1 shows a raceway base 225 of generally T-shaped cross section adapted for mounting to a wall structure or the like. Spaced mounting holes 602.602 are provided for this purpose at spacing 2x, x being the spacing between lines of weakening 604 in the raceway. Further, the T-shaped base 225 includes knockout openings 606 at similar locations spaced along the length of the raceway base, as indicated at 2x in FIG. 1. These knockout openings 606 are provided for accommodating cables passing through the dividing wall from one wire-way into the adjacent wire-way, on the opposite side of the dividing wall defined by the stem portion of the T-shaped base.

Figure 2:
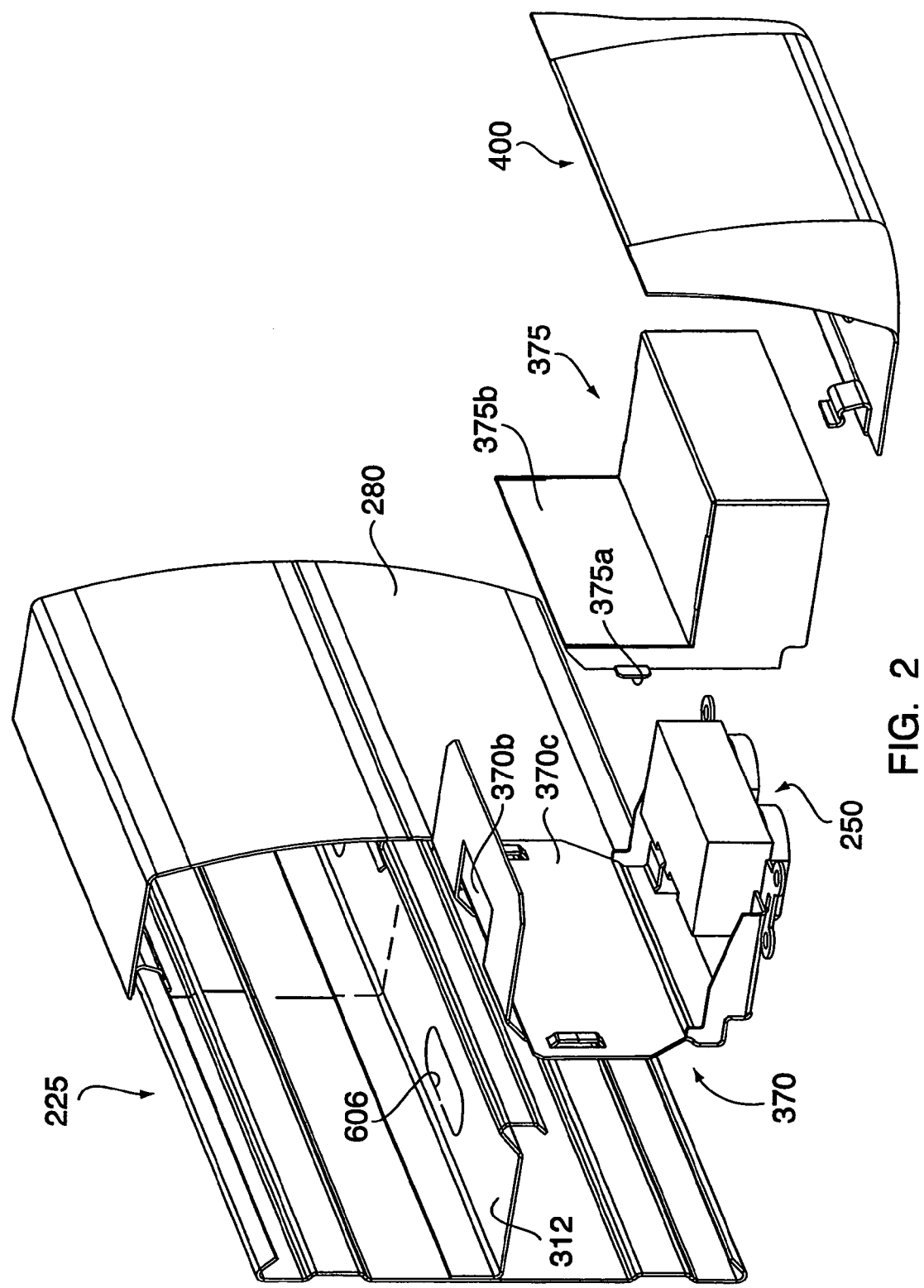
FIG. 2 is taken from FIG. 13 of our co-pending application and illustrates in exploded perspective relationship a device bracket having a downwardly facing power receptacle, together with an enclosure adapted to be fitted with the device bracket, and a device bracket cover for use therewith.

Still with reference to the disclosure in our co-pending application referred to previously, FIG. 2 is a reproduction of FIG. 13 from that earlier case. Cabling can be from the upper wire-way, passing through the stem portion of the T-shaped base 312. More particularly, FIG. 2 illustrates the structure required to accommodate wiring from the upper raceway to the outlet device 250 which is downwardly facing, and which is adapted to reside in a lower wall between spaced raceway covers in the lower wire-way.

The outlet device 250 is supported in a bracket 370, the bracket being generally U-shaped as shown, having legs spaced one above the other. The lower leg serves as a mounting for the outlet device 250, and the upper leg is provided with an opening 370b that can be aligned with one of the knockout openings 606 in the web of the T-shaped base so as to accommodate cross over cables running from the upper wire-way to the lower wire-way.

Still with reference to FIG. 2, an enclosure or shroud 375 as also shown in our prior co-pending case, is adapted for assembly with the U-shaped device bracket 370 as a result of tabs 375a being received in apertures 370a in the bracket for this purpose. Still with reference to FIG. 2, the enclosure 375 can be seen to have a generally L-shape, the lower portion serving to isolate the outlet device 250 from wires in the lower wire-way, and the vertically extending leg 375b spaced forwardly of the vertical flange 370c of the device bracket 370 to define a pathway for the cross over cabling.

Figure 3:
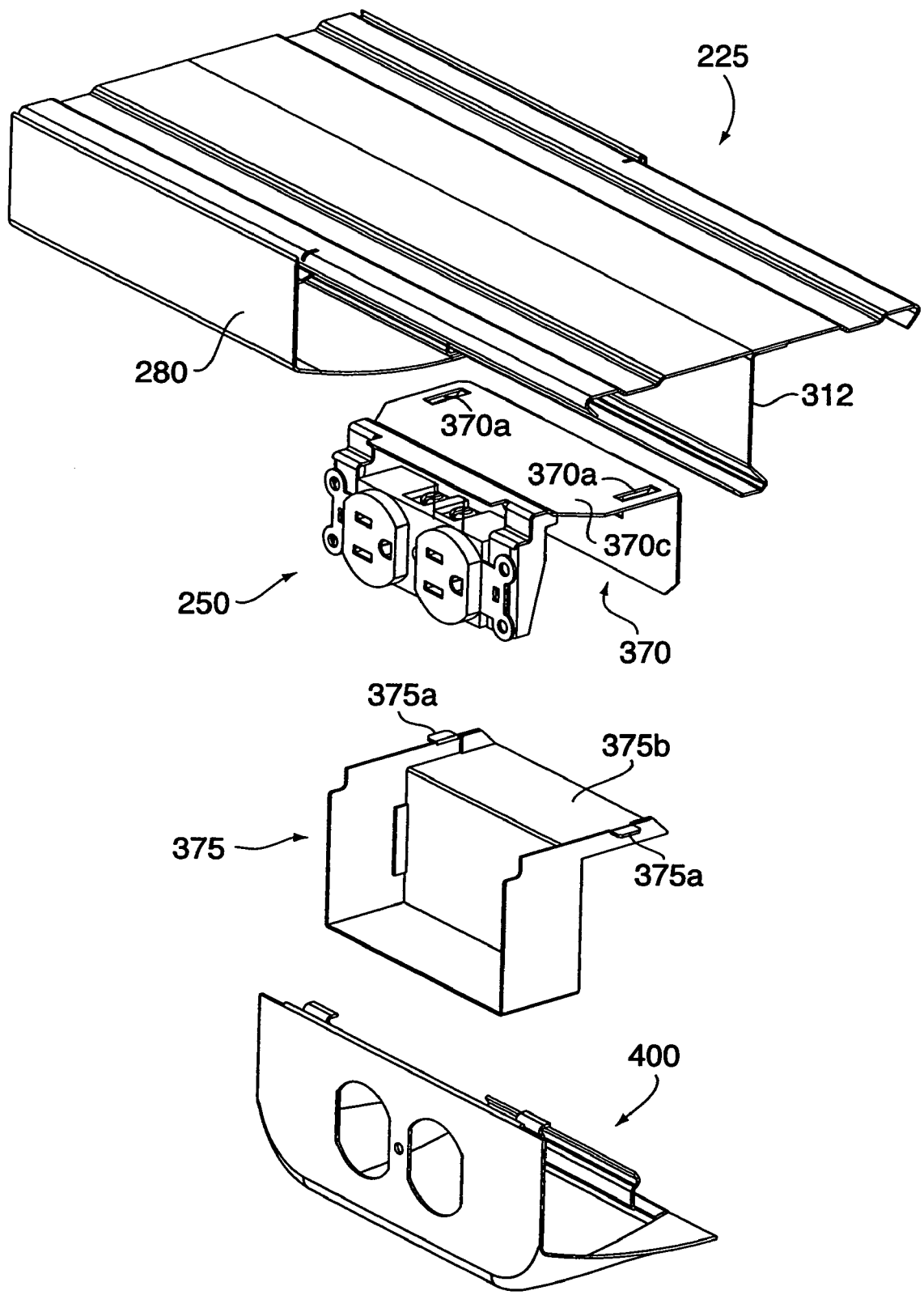
FIG. 3 is a view similar to FIG. 14 of our co-pending application and shows the components of FIG. 2 from below, again in exploded perspective relationship.

Still with reference to our prior co-pending case, an outlet device cover 400 is adapted to be assembled with the raceway as shown in FIGS. 2 and 3 from that disclosure. (See FIGS. 13 and 14) From the bottom quartering perspective exploded view of FIG. 3 it will be noted that the U-shaped device bracket 370 supports the outlet device 250, and the vertical flange 370c is adapted to be provided adjacent to the back wall of the raceway base with the result that the opening 370b in the upper leg of U-shaped device bracket can be aligned with the knockout opening in the raceway base stem portions 312.

FIG. 3 illustrates to best advantage the opening defined by the L-shaped enclosure 375. Leg 375b is spaced forwardly of the vertical flange 370c in the device bracket so as to define a cross over pathway for cables directed from the upper wire-way through the aligned openings in the stem 312 and the opening 370b in the device bracket 370.

DETAILED DESCRIPTION OF FIGS. 4–11 INCLUSIVELY

Figure 4:
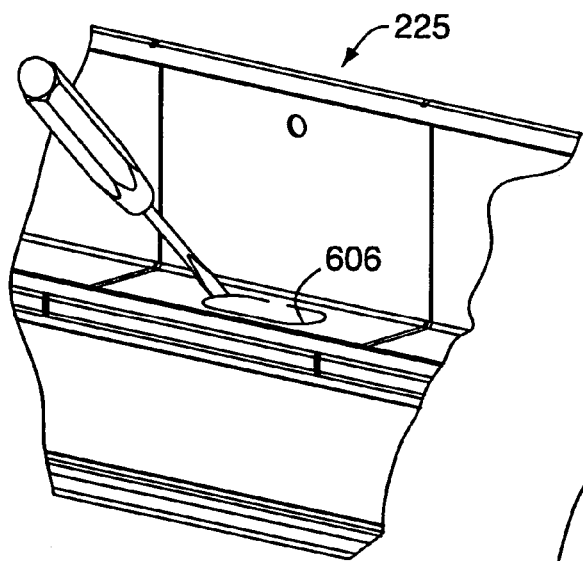
FIG. 4 is a view of the T-shaped raceway base with one of the knockout openings being separated from the T-shaped base divider wall.

Turning next to a description of the installation of the various components described in the preceding paragraphs, FIG. 4 shows a T-shaped raceway base, 225, with one of the knockout openings 606 defined in the web portion thereof in the process of being removed by a tool.

Figure 5:
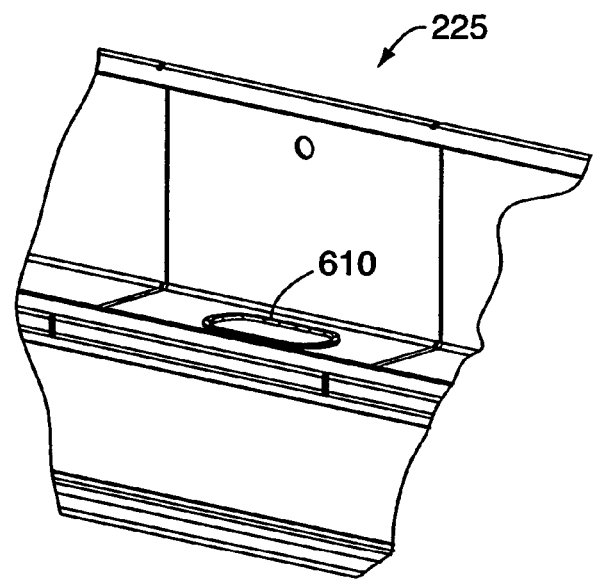
FIG. 5 is a view similar to FIG. 4, but illustrating a grommet provided in the knockout opening after removal of the knockout.

FIG. 5 shows the opening after removal of the knockout, and after installation of a grommet 610 that serves to protect cross over cabling running through the divider or web from the upper to the lower wire-way.

Figure 6:
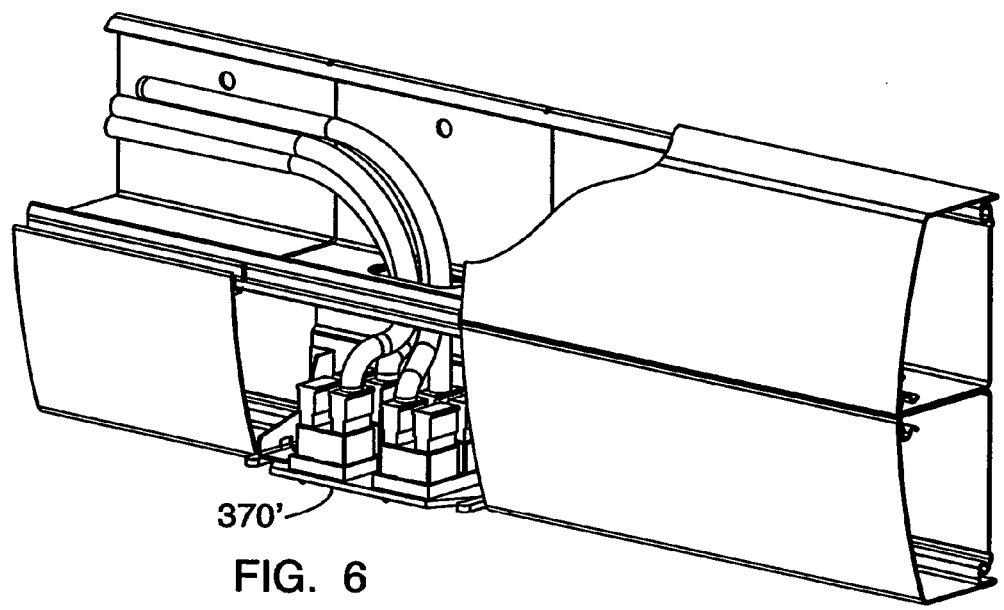
FIG. 6 is a top perspective view of the device bracket and associated outlet devices mounted in the lower wire-way, defined below the divider wall, and illustrates several cross over cable provided through the knockout opening and connected to the outlet devices.

FIG. 6 illustrates several telecommunications/data outlet devices mounted in a device bracket 370' provided in the lower wire-way of the raceway, Cross over cables are run through the grommeted openings 606 from the upper to the lower wire-way for connection to these outlet devices. The devices shown are data/communication devices, and the cables are of relatively stiff materials so as to require the relatively generous radius of curvature shown.

FIG. 7 shows an assembly incorporating the components of FIG. 6, with the enclosure 375' provided in place on the device bracket as described previously with reference to FIGS. 2 and 3.

FIG. 7 A–A is a cross section showing the cross over pathway provided for the cables C from the upper wire-way through the web and into the enclosure associated with the downwardly facing receptacle, in the lower wire-way.

Figure 8:
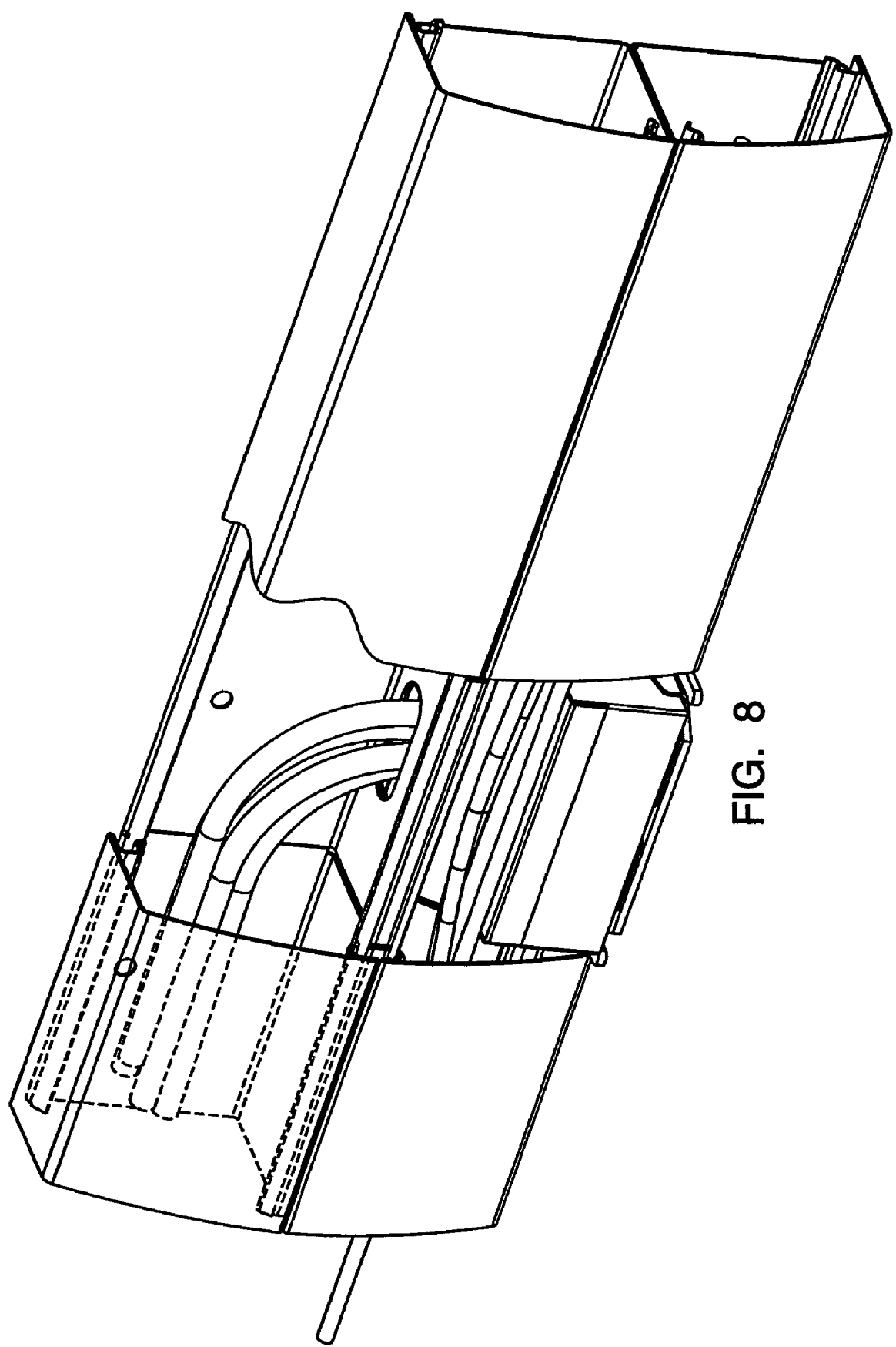
FIG. 8 illustrates the bypass feature of the enclosure, allowing cables in the lower wire-way to bypass the shrouded outlet device in its downwardly facing orientation in the lower wire-way.
Figure 9:
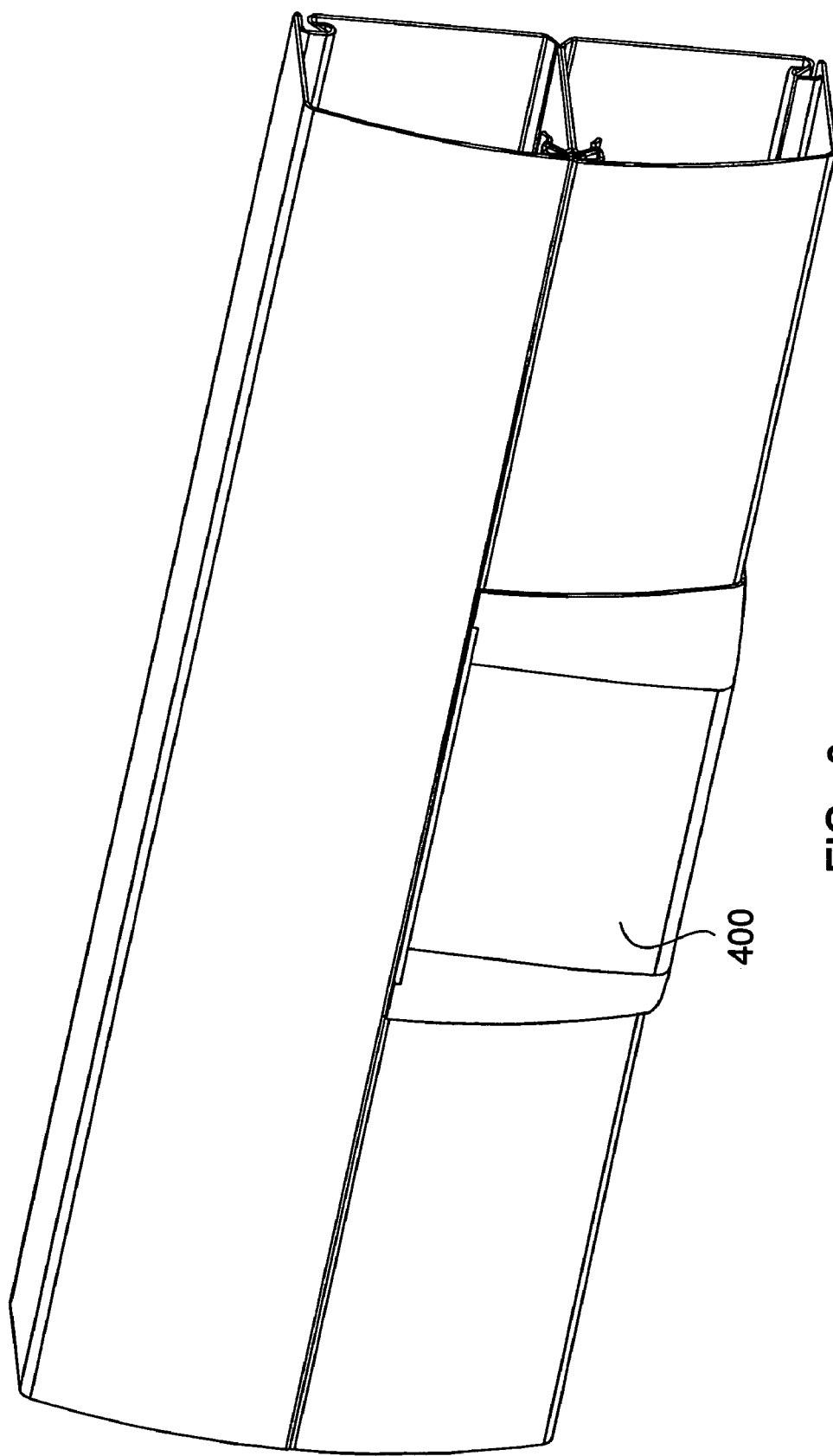
FIG. 9 is a view similar to FIG. 8, but illustrating the generous radius of curvature provided for the cables in the upper wire-way to transition through the opening in the divider wall, and between inside of the enclosure and the device bracket into the space defined between the enclosure and the device bracket itself.

FIG. 8 is similar to FIG. 6, and also shows the generous radius of curvature for the cable in the upper wire-way that crosses the web portion of the base for entry into the enclosure associated with the outlet device, that downwardly face in relationship to the lower wire-way. Note that cables B pass by the enclosure 375' and are isolated from the cables C Finally, FIG. 9 shows the last stage in the installation, with cover 400 provided in overlapping relationship to the spaced end portions of the lower raceway covers 280, 280. The cover 400' is held in place by snapping onto the raceway base as described in the previously cited co-pending application.

Original drawings from our earlier filed case disclose only a power outlet device, which is located in the downwardly facing direction with respect to the lower wire-way. Other outlet devices, such as telephone or data communication jacks, for example, can be similarly arranged in downwardly facing relationship within the lower wire-way in a device bracket as shown in FIGS. 6,7, and 8. It is an important feature of the present invention that cabling of the fiber optic variety with limited bend radius requirements can be accommodated. Raceways generally require such cabling to be accommodated in restricted spaces, and this leads to limitations on the ability to locate data/communications outlet plugs in such raceways requiring the use of raceway of a much larger cross section than should be necessary.

The present invention affords the architect, and the consulting design engineer the opportunity to provide a relatively generous bend radius for cabling in the upper wire-way. The design allows fiber optic cable to pass through the wire-way divider wall into an adjacent wire-way where the outlet devices face downwardly, in a direction that makes it very convenient for the installer to connect cable ends to such cable jacks as are provided downwardly in the lower wire-way. The user can connect to these jacks in a way that renders such connecting cables relatively less obtrusive. The drawings presented, illustrate the generous radius of curvature for the cabling C. A generous radius of curvature is provided for the cable passing through the crossover pathway to the devices provided in downwardly facing relationship in the lower wire-way.

The drawings and description emphasize the advantages to orienting outlet devices "downwardly" in the raceway as shown. This orientation offers many advantages, but persons skilled in this art will appreciate that many of these advantages can also be realized when outlet devices are oriented "upwardly", as would be the case at a work station coral for example. The outlet devices may also face forwardly, or rearwardly relative to the raceway dividing wall in the event the raceway is mounted on a horizontal surface. Thus, the term "downwardly" as used in the appended claims should be taken as meaning only that the orientation of the device bracket in the raceway results in a position for the outlet device that is perpendicular to the surface that the raceway itself is mounted to. The modifier "downwardly" is intended to mean only that the outlet device can be positioned parallel to the divider wall of the base, and perpendicular to the surface or wall structure on which the raceway is mounted. A vertical wall may be the preferred such structure, but other flat surfaces may also provide a support structure for the unique raceway design disclosed herein, and in our co-pending application Ser. No. 11/035477. In light of the above, it is therefore understood that within the scope of the appended claim, the invention may be practiced otherwise than as specifically claimed.

What is claimed is:

1. A raceway system comprising:
an elongated raceway base, elongated raceway cover components mounted on said base and defining upper and lower wire-ways, an elongated dividing wall separating said upper and lower wire-ways so that low voltage cables in one of said upper and lower wire-ways are electrically isolated from high voltage cables in the other of said upper and lower wire-ways, said elongated dividing wall having spaced knockout openings, a device bracket mounted in said lower wire-way for supporting at least one outlet device in downwardly facing relationship to said lower wire-way, and an enclosure mounted to said device bracket inside said lower wire-way, said endosure isolating said outlet device from cables running along said lower wire-way, said endosure and said device bracket cooperating with a knockout opening to define an enclosed pathway for accommodating cables from said upper wire-way through said divider knockout opening for connection to the outlet device oriented in downwardly facing relationship to said lower wire-way.

2. The Raceway system according to claim 1 wherein said elongated raceway base defines said elongated dividing wall, and said raceway cover components including separate upper and lower raceway covers cooperating with said base to define said upper and lower wire-ways respectfully.

3. The raceway system according to claim 2 wherein said lower raceway covers are spaced apart to define a gap there-between, and wherein said device bracket is provided in said gap.

4. The raceway system according to claim 3 further including a device bracket cover overlying said spaced apart covers and the gap defined between said spaced lower raceway covers.

5. The raceway system according to claim 1 wherein said elongated raceway base has a T-shaped cross section such that a stem portion of the T-shaped base defines said dividing wall, and said raceway cover components mounted to said dividing wall, and said raceway cover components including separate upper and lower raceway covers to cooperate with said T-shaped base to define said upper and lower wire-ways respectively.

6. The raceway system according to claim 5 wherein said lower raceway covers are spaced apart to define a gap there-between, and said device bracket provided in said gap.

7. The raceway system according to claim 6 further including a device bracket cover overlying the gap between said spaced lower raceway covers.

8. The raceway system according to claim 1 further including a device bracket cover mounted to said dividing wall in a gap between spaced end portions of said cover components.

9. The raceway system according to claim 8 wherein said, device bracket is of generally U-shape such that a base of the U-shape lies adjacent to the raceway base, and such that a lower leg of the U-shape device bracket defines an opening for receiving an outlet device.

10. The raceway system according to claim 9 further characterized by said endosure mounted to said U-shaped device bracket, said housing including a rear wall that cooperates with the base of the U-shaped device bracket to define a path-way for cables run from the upper wire-way through the pathway to the lower wire-way for connection to an outlet device provided in said gap between said spaced lower raceway covers.

11. A raceway system comprising: an elongated raceway base for mounting on a flat structure such as a wall, elongated raceway cover components mounted on said base and defining adjacent wire-ways, an elongated dividing wall separating said wire-ways so that low voltage cables in one of said wire-ways are electrically isolated from high voltage cables in the other of said wire-ways, said elongated dividing wall having spaced knockout openings, a device bracket mounted in one of said wire-ways for supporting at least one outlet device oriented perpendicular to the base, and an enclosure mounted to said device bracket inside said one wire-way, said enclosure isolating said outlet device from cables running along said one wire-way, said enclosure and said device bracket cooperating with said base to define an enclosed pathway for accommodating cables from the other of said wire-ways across said divider wall through one of said knockout openings in said divider wall for connection to the outlet device.

12. The raceway system according to claim 11, wherein said elongated raceway base is of a T-shape such that a stem portion of said T-shape defines said dividing wall.

13. The raceway system according to claim 11, wherein said adjacent wire-ways separated by said dividing walls are fitted with separate raceway covers.

14. The raceway system according to claim 13 wherein said device bracket is provided in a gap between end portions of spaced raceway covers.

15. The raceway system according to claim 14 further including a device bracket cover overlaying said gap, said device bracket cover being held in place by interengaging portions of said dividing wall and said raceway base.

16. A perimeter raceway system comprising a plurality of elongated base components adapted for mounting on a wall structure,
a plurality of elongated raceway cover components removably received on these base components to define at least one elongated wire way:
at least one elongated raceway cover component of generally L-shape cross section and having a downwardly facing elongated surface oriented generally perpendicular to the wall surface when the raceway base components, are mounted on a wall surface, and
an outlet device provided in an opening defined by said downwardly facing raceway cover surface.

17. The combination according to claim 16 further including at least one device bracket for supporting said outlet device so that the outlet device is provided in said downwardly facing elongated surface of said L-shaped cover component, said one device bracket including a protective enclosure surrounding said outlet device to isolate from wiring in that wireway.

18. The combination according to claim 16 further including a second L-shape cover component cooperating with said one L-shape cover component and said second L-shape cover component being spaced longitudinally from said one cover component and, a second device bracket provided between said spaced first and second cover components.

19. The combination according to claim 18 further including an endosure secured to said first device bracket for isolating wiring to the outlet device from a second elongated wire way isolated from said at least one wire way.

20. The combination according to claim 16 further including additional outlet devices provided in longitudinally spaced relation to said one outlet device in said L-shaped cover component downwardly facing surface, and said L-shape cover component being pre-wired so that said outlet devices are interconnected electrically by wiring provided in said at least one wire way.

21. The combination according to claim 16 wherein said base components are of T-shaped cross section with at least top and bottom cover components mounted thereon, said cover component defining said bottom cover component and spanning approximately one half the height of the T-shaped base component, said top cover component spanning the other half of the height of the T-shaped base component.

* * * * *

UNITED STATES PATENT AND TRADEMARK OFFICE
CERTIFICATE OF CORRECTION

PATENT NO. : 7,193,159 B2  
APPLICATION NO. : 11/322707  
DATED : March 20, 2007  
INVENTOR(S) : Mark Makwinski et al.

It is certified that error appears in the above-identified patent and that said Letters Patent is hereby corrected as shown below:

Column 5, line 57 please delete the word "endosure" and replace with --enclosure--.  
Column 5, line 59 please delete the word "endosure" and replace with --enclosure--.  
Column 6, line 36 please delete the word "endosure" and replace with --enclosure--.  
Column 8, line 8 please delete the word "endosure" and replace with --enclosure--.

Signed and Sealed this

Fourth Day of March, 2008

JON W. DUDAS  
*Director of the United States Patent and Trademark Office*